(12) United States Patent
Jordy et al.

(10) Patent No.: US 11,563,212 B2
(45) Date of Patent: Jan. 24, 2023

(54) SACRIFICIAL ACTIVE MATERIAL OF A POSITIVE ELECTRODE FOR A LITHIUM-ION ELECTROCHEMICAL ELEMENT

(71) Applicants: SAFT, Levallois-Perret (FR); ENSICAEN, Caen (FR); UNICAEN, Caen (FR); CENTRE NATIONAL DE LA RECHERCHE SCIENTIFIQUE (CNRS), Paris (FR)

(72) Inventors: Christian Jordy, St Louis de Montferrand (FR); Melanie Freire, Gagny (FR); Valerie Pralong, Caen (FR)

(73) Assignees: SAFT, Levallois-Perret (FR); ENSICAEN, Caen (FR); UNICAEN, Caen (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 423 days.

(21) Appl. No.: 16/624,632

(22) PCT Filed: May 22, 2018

(86) PCT No.: PCT/EP2018/063373
§ 371 (c)(1),
(2) Date: Dec. 19, 2019

(87) PCT Pub. No.: WO2018/233963
PCT Pub. Date: Dec. 27, 2018

(65) Prior Publication Data
US 2020/0136140 A1    Apr. 30, 2020

(30) Foreign Application Priority Data

Jun. 20, 2017   (FR) ...................................... 1755608

(51) Int. Cl.
*H01M 4/505* (2010.01)
*C01G 45/12* (2006.01)
(Continued)

(52) U.S. Cl.
CPC ........ *H01M 4/505* (2013.01); *C01G 45/1221* (2013.01); *C01G 45/1278* (2013.01);
(Continued)

(58) Field of Classification Search
CPC ...... H01M 4/505; H01M 4/525; H01M 4/587; H01M 4/5825; C01G 45/1221;
(Continued)

(56) References Cited

U.S. PATENT DOCUMENTS

2013/0323597 A1* 12/2013 Levy ...................... C01D 15/02
252/519.1

FOREIGN PATENT DOCUMENTS

WO    WO 2015-011883    *   1/2015

OTHER PUBLICATIONS

Buzanov et al, "Isothermal Diagrams of the Li2O—MnO—MnO2 System", Doklady, Chemistry, Maik Nauka/Internperiodica Publishing, Moscow, RU, vol. 465, No. 1, 5, 2015, pp. 268-271.*
(Continued)

*Primary Examiner* — Brittany L Raymond
(74) *Attorney, Agent, or Firm* — Sughrue Mion, PLLC (57) ABSTRACT

A sacrificial positive active material for a lithium-ion electrochemical element which is a compound of formula $(Li_2O)_x (MnO_2)_y (MnO)_z (MO_a)_t$ in which: $x+y+z+t=1$; $1-x-y \geq 0$; $0.97 \geq x \geq 0.6$; $y \leq 0.45$; $x - 0.17$; $y \geq 0$; $y+z>0$; $t \geq 0$; $1 \leq a < 3$. M is selected from the group consisting of Fe, Co, Ni, B, Al, Ti, Si, V, Mo, Zr and a mixture thereof.

23 Claims, 5 Drawing Sheets

(51) Int. Cl.
  *H01M 4/36* (2006.01)
  *H01M 4/525* (2010.01)
  *H01M 4/58* (2010.01)
  *H01M 4/587* (2010.01)
  *H01M 10/0525* (2010.01)

(52) U.S. Cl.
  CPC ........ *C01G 45/1285* (2013.01); *H01M 4/364* (2013.01); *H01M 4/525* (2013.01); *H01M 4/587* (2013.01); *H01M 4/5825* (2013.01); *H01M 10/0525* (2013.01); *C01P 2002/72* (2013.01); *C01P 2006/40* (2013.01)

(58) Field of Classification Search
  CPC ............ C01G 45/1278; C01G 45/1285; C01P 2002/60; C01P 2002/72
  See application file for complete search history.

(56) References Cited

OTHER PUBLICATIONS

English translation of WO Publication 2015-011883, Jan. 2015.*

* cited by examiner

SACRIFICIAL ACTIVE MATERIAL OF A POSITIVE ELECTRODE FOR A LITHIUM-ION ELECTROCHEMICAL ELEMENT

CROSS REFERENCE TO RELATED APPLICATIONS

This application is a National Stage of International Application No. PCT/EP2018/063373 filed May 22, 2018, claiming priority based on French Patent Application No. 1755608 filed Jun. 20, 2017.

FIELD OF THE INVENTION

The technical field of the invention is that of electrochemically active materials intended for use in the positive electrode (or cathode) of a rechargeable electrochemical cell (or battery) of the lithium-ion type.

PRIOR ART

The operation of a lithium-ion electrochemical cell is based on the principle of reversible insertion of lithium into a host structure of an electrochemically active material. When the cell is charged, the electrochemically active material of the positive electrode oxidizes and extracts lithium from its structure while the electrochemically active material of the negative electrode reduces and lithium is inserted into its structure. Conversely, when the cell is discharged, the electrochemically active material of the positive electrode reduces and inserts lithium into its structure, while the electrochemically active material of the negative electrode oxidizes and lithium extracts from its structure.

Graphite is commonly used as an electrochemically active material in the negative electrode of a lithium-ion cell. When the cell is first charged, a passivation layer on the surface of the negative electrode is formed by decomposition of the electrolyte contained in the cell. Its formation is necessary because it avoids the exfoliation of graphite, leading to a high irreversible capacity, by preventing the co-intercalation of solvent. This passivation layer consumes lithium which will no longer be used to insert and extract and will therefore not participate in subsequent discharges. It is the cause of an irreversible capacity of the negative electrode.

At the positive electrode, during the discharge of the electrochemical cell, a fraction of the lithium does not re-enter the structure of the electrochemically positive active material. This unused fraction constitutes the irreversible capacity of the positive electrode.

Some lithium-ion electrochemical cells are characterized by an irreversible capacity of the negative electrode greater than that of the positive electrode. Examples include:

electrochemical cells comprising a graphite-based negative electrode and a positive electrode based on $LiCoO_2$, or based on a lithium nickel manganese cobalt oxide (NMC), or based on a lithium nickel cobalt aluminium oxide (NCA), or based on $LiFePO_4$ or electrochemical cells the negative electrode of which is based on silicon, have an irreversible capacity which can reach up to 30 to 40%.

Figure 1A:
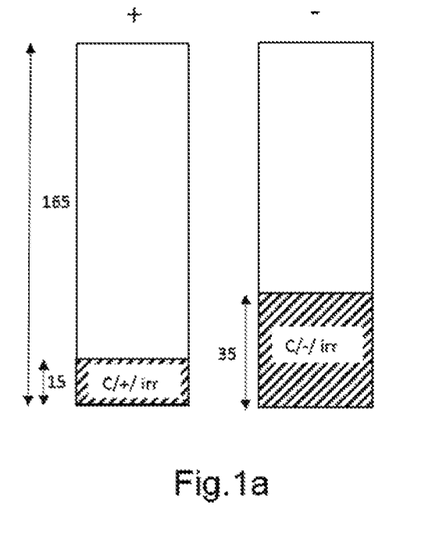
FIG. 1a schematically shows the capacities of the positive electrode and the negative electrode of a lithium-ion electrochemical cell according to the prior art in which the irreversible capacity of the negative electrode is greater than that of the positive electrode.

One of the consequences of the existence of this difference in these irreversible capacities is the non-use of part of the capacity of the electrode with the lowest irreversible capacity. The energy density of the electrochemical cell is then lower than that of a cell the irreversible capacities of which would be identical for both electrodes. This problem is illustrated in FIG. 1a. The left rectangle represents the capacity of the positive electrode. The right rectangle represents that of the negative electrode. The unhatched part of each rectangle represents the reversible capacity while the hatched part represents the irreversible capacity. It can be seen that the positive electrode and the negative electrode have the same total capacity but have different irreversible capacities. The positive electrode has a lower irreversible capacity than the negative electrode. Since the discharge of the electrochemical cell is limited by the electrode with the lowest reversible capacity, the discharge of the cell will stop when the reversible capacity of the negative electrode will have been fully used. Therefore, there is a fraction of electrochemically active material in the positive electrode that will not be used during the discharge of the electrochemical cell. This unused fraction corresponds to the difference in the area of the two hatched surfaces. This fraction of unused positive active material represents a certain mass and volume of the positive electrode. It therefore penalizes the mass capacity and volume capacity of the electrochemical cell.

Different ways have been sought to reduce the difference between the irreversible capacity of the positive electrode and the irreversible capacity of the negative electrode. Irreversible capacities can be artificially equalized either by pre-charging the negative electrode, for example by adding lithium metal, or by adding an active material of high irreversible capacity, also called sacrificial positive material, to the positive electrode. In the latter case, the use of an active material with a high irreversible capacity makes it possible to lighten the positive electrode since, compared to an active material with a low irreversible capacity, it is sufficient to use a smaller mass of active material for a given irreversible capacity.

Different sacrificial positive active materials are known. Examples include:

$Li_2NiO_2$, which has a total capacity of 350 mAh/g. This active material is described in *Chem. Mater.* 2010, 22, 1263-1270.

$LisFeO_4$, which has a capacity of 700 mAh/g. This active material is described in *Electrochemica Acta* 108, 2013, 591-595.

Document WO 2015/011883 describes a sacrificial positive active material of the formula $Li_6MnO_4$, or $(Li_2O)_{0.75}(MnO)_{0.25}$. The disadvantage of this active material is that it must be charged to a high potential, i.e. higher than 4.4V compared with lithium metal. The charging potential indicated in FIG. 8 of document WO 2015/011883 is indeed 4.5 V. Such a potential is detrimental to the life of the electrochemical cell. On the other hand, this figure shows that for a charging voltage of 4.4V, the charged capacity is less than 450 mAh/g. For a charging voltage of 4V, the charged capacity is less than 100 mAh/g, which is very low. What is sought, therefore, is a sacrificial positive active material with a higher charged capacity and for a charge potential with respect to lithium not exceeding 4.4V.

SUMMARY OF THE INVENTION

The invention proposes novel compounds that can be used as sacrificial positive active materials. These compounds have a high irreversible capacity, preferably from 630 mAh/g to about 1200 mAh/g.

A first object of the invention is a compound of the formula wherein
x+y+z+t=1
1−x−y≥0
0.97≥x≥0.6
y≤0.45·x−0.17
y≥0
y+z>0
t≥0
1≤a<3
M is selected from the group consisting of Fe, Co, Ni, B, Al, Ti, Si, V, Mo, Zr and a mixture thereof.

This compound can crystallize in the cubic system.

It can present an X-ray diffraction pattern, in which the width at mid-height of the line at a 2-theta angle between 40° and 45° is greater than 1°, the wavelength used being the Kalpha wavelength of copper.

According to an embodiment, x≥0.7, preferably x≥0.8, preferably still x≥0.9.

According to an embodiment, y=z+/−0.05.

According to an embodiment, y≤0.2, preferably y≤0.1.

According to an embodiment, z≤0.4, preferably z≤0.3, preferably still z≤0.2, preferably still z≤0.1.

According to an embodiment, t=0.

A second object of the invention is a composite material comprising the compound as described above and a $Li_2O$ crystalline phase.

This composite material can contain from 1 to 10% by mass of carbon.

A third object of the invention is an electrode comprising a first sacrificial electrochemically active material which is the compound as described above and at least one second electrochemically active material.

According to an embodiment, the second electrochemically active material is chosen from the group consisting of:
  compound i) of formula $Li_xMn_{1−y−z}M'_yM''_zPO_4$ (LMP), where M' and M'' are different from each other and are selected from the group consisting of B, Mg, Al, Si, Ca, Ti, V, Cr, Fe, Co, Ni, Cu, Zn, Y, Zr, Nb and Mo, with 0.8≤x≤1.2; 0≤y≤0.6; 0≤z≤0.2;
  compound ii) of formula $Li_xM_{2−x−y−z−w}M'_yM''_zM'''_wO_2$ (LMO2), where M, M', M'' and M''' are selected from the group consisting of B, Mg, Al, Si, Ca, Ti, V, Cr, Mn, Fe, Co, Ni, Cu, Zn, Y, Zr, Nb and Mo, provided that M or M' or M'' or M''' is selected from Mn, Co, Ni or Fe; M, M', M'' and M''' being different from each other; with 0.8≤x≤1.4; 0≤y≤0.5; 0≤z≤0.5; 0≤w≤0.2 and x+y+z+w<2;
  compound iii) of formula $Li_xMn_{2−y−z}M'_yM''_zO_4$ (LMO), where M' and M'' are selected from the group consisting of B, Mg, Al, Si, Ca, Ti, V, Cr, Fe, Co, Ni, Cu, Zn, Y, Zr, Nb and Mo; M' and M'' being different from each other, and 1≤x≤1.4; 0≤y≤0.6; 0≤z≤0.2;
  compound iv) of formula $Li_xFe_{1−y}M_yPO_4$, where M is selected from the group consisting of B, Mg, Al, Si, Ca, Ti, V, Cr, Mn, Co, Ni, Cu, Zn, Y, Zr, Nb and Mo; and 0.8≤x≤1.2; 0≤y≤0.6;
  compound v) of formula $xLi_2MnO_3$; $(1−x)LiMO_2$ where M is selected from Ni, Co and Mn and x≤1;
  and a mixture of one or more of the compounds i) to v).

According to an embodiment, the electrode comprises the compound ii) and
M is Ni;
M' is Mn;
M'' is Co and
M''' is selected from the group consisting of B, Mg, Al, Si, Ca, Ti, V, Cr, Mn, Fe, Co, Ni, Cu, Zn, Y, Zr, Nb and Mo; with 0.8≤x≤1.4; 0<y≤0.5; 0<z≤0.5; 0≤w≤0.2 and x+y+z+w<2.

According to an embodiment, the electrode comprises the compound ii) and
M is Ni;
M' is Co;
M'' is Al; and
1≤x≤1.15;
y>0;
z>0;
w=0.

According to an embodiment, the electrode comprises the compound ii) and x=1; 0.6≤2−x−y−z≤0.85; 0.10≤y≤0.25; 0.05≤z≤0.15.

According to an embodiment, the electrode comprises the compound ii) of formula $LiCoO_2$.

According to an embodiment, the electrode comprises compound iv). Preferably, compound iv) has the formula $LiFePO_4$.

According to an embodiment, the electrode comprises the compound iii) with x=1; 0≤y≤0.1; z=0 and M' is Al. The compound iii) may have the formula $LiMn_2O_4$.

According to an embodiment, the mass percentage of the compound as described above is less than or equal to 5% of the total mass of all electrochemically active materials, preferably less than or equal to 2%.

A fourth object of the invention is an electrochemical cell of the lithium-ion type comprising a positive electrode as described above.

According to an embodiment, the electrochemical cell comprises:
  at least one negative electrode comprising a graphite-based active material,
  at least one positive electrode comprising at least one of the compounds i) to v) described above, or a mixture thereof.

According to an embodiment, the electrochemical cell comprises:
  at least one negative electrode comprising an active material selected from the group consisting of tin, silicon, carbon and silicon-based compounds, carbon and tin-based compounds, carbon, tin and silicon-based compounds; lithium titanium oxide compounds, such as lithium titanate $Li_4Ti_5O_{12}$
  at least one positive electrode comprising the compound according to the invention.

Finally, a fifth object of the invention is a process for manufacturing the compound as described above, said process comprising the steps of:
a) provision of a mixture of $Li_2O$, MnO, $MnO_2$ and optionally MO;
b) grinding the mixture in an inert atmosphere;
c) heating the mixture in an inert atmosphere at a temperature between 800 and 1000° C.;
d) cooling of the mixture to room temperature;
e) grinding the mixture in an inert atmosphere;
f) possibly adding carbon to the mixture;
g) possibly grinding the mixture in an inert atmosphere.

BRIEF DESCRIPTION OF THE FIGURES

FIG. 1b schematically represents the capacities of the positive electrode and the negative electrode of a lithium-ion electrochemical cell according to the invention in which the difference between the irreversible capacity of the positive electrode and the irreversible capacity of the negative electrode has been reduced compared with the situation illustrated in FIG. 1a.

DESCRIPTION OF DETAILED EMBODIMENTS

The compound according to the invention has the formula $(Li_2O)_x(MnO_2)_y(MnO)_z(MOa)_t$ wherein
$x+y+z+t=1$
$1-x-y \geq 0$
$0.97 \geq x \geq 0.6$
$y \leq 0.45 \cdot x - 0.17$
$y \geq 0$
$y+z>0$
$t \geq 0$
$1 \leq a < 3$
M is selected from the group consisting of Fe, Co, Ni, B, Al, Ti, Si, V, Mo, Zr and a mixture thereof.

This formula defines a composition range. This composition range can be represented in a ternary diagram. Assuming that cell M is absent from the compound, the formula of the compound according to the invention can be rewritten: $(Li_2O)_x (MnO_2)_y (MnO)_z$. The three pure components $Li_2O$, $MnO_2$ and $MnO$ are the three vertices of this ternary diagram.

Figure 2:
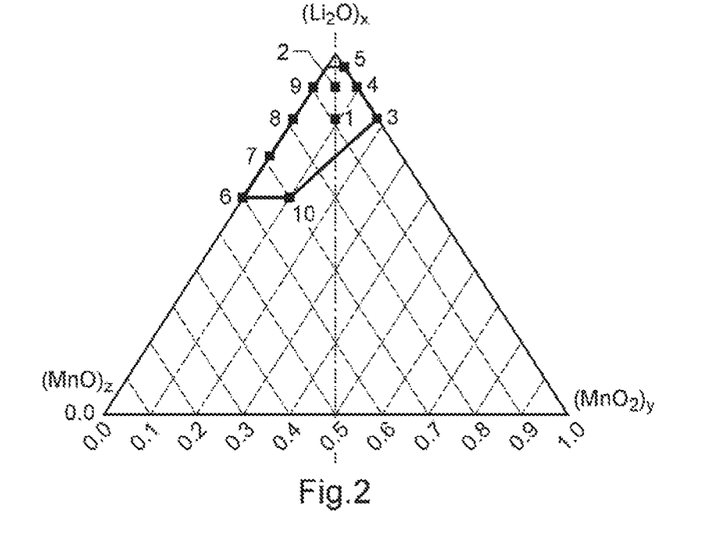
FIG. 2 is a ternary diagram ($Li_2O$, $MnO$, $MnO_2$) showing the compositional domain to which the compound according to the invention belongs and the position in that domain of the compounds in the examples in Table 1 below.

Five criteria are imposed on parameters x, y and z. They define the composition range of the compound according to the invention in the ternary diagram. These criteria are as follows:
Criterion 1: $x \geq 0.6$
Criterion 2: $y \leq 0.45 \cdot x - 0.17$
Criterion 3: $x \leq 0.97$
Criterion 4: $y+z>0$
Criterion 5: $1-x-y \geq 0$ FIG. 2 shows the composition domain in the ternary diagram. This domain is delimited by a thick line. The points included in this domain meet the five criteria above.

The applicant found that the theoretical capacity of the compound according to the invention increased with the $Li_2O$ content. Therefore, x is preferably greater than or equal to 0.7, preferably still x is greater than or equal to 0.8, preferably still x is greater than or equal to 0.9.

The applicant also found that when the quantity of MnO is close to that of $MnO_2$, a high capacity was obtained. "Close to" means $y=z \pm 0.05$. In the ternary diagram in FIG. 2, this condition is met for the points on the vertical bisector of the triangle passing through the $Li_2O$ vertex.

According to a preferred embodiment, the compound according to the invention is devoid of the cell M, i.e. $t=0$.

The compound according to the invention is generally nanostructured. The size of the crystallites is typically less than 50 nm, preferably less than or equal to 10 nm, preferably even less than or equal to 5 nm. This nanostructure can be demonstrated by using the X-ray diffraction technique. The X-ray diffraction pattern on a powder of the compound has a peak at a 2-theta angle between 40° and 45°, the width at mid-height of which is greater than 1°. The wavelength used for the measurement is the Kalpha wavelength of copper. The width at mid-height can be greater than or equal to 2°, greater than or equal to 3°. It has been observed that the width at mid-height of the peak increases as the size of the crystallites decreases. Typically, a width at mid-height peak of about 2° corresponds to a crystallite size of about 5 nm.

The compound according to the invention generally crystallizes in the cubic system. The cubic system can be demonstrated by using the Rietveld refinement method which uses the X-ray diffraction technique.

A second $Li_2O$ phase is usually present with the compound of the invention. The X-ray diffraction pattern characteristic of the presence of the $Li_2O$ phase has peaks at the following 2-theta angles: 34°, 39°, 56°, 71° and 84°±1°, the angle being obtained using the Kalpha wavelength of copper.

The compound according to the invention is generally used in mixture with at least one second electrochemically active material. This second electrochemically active material can be selected from the group consisting of:
compound i) of formula $Li_xMn_{1-y-z}M'_yM''_zPO_4$ (LMP), where M' and M" are different from each other and are selected from the group consisting of B, Mg, Al, Si, Ca, Ti, V, Cr, Fe, Co, Ni, Cu, Zn, Y, Zr, Nb and Mo, with $0.8 \leq x \leq 1.2$; $0 \leq y \leq 0.6$; $0 \leq z \leq 0.2$;
compound ii) of formula $Li_xM_{2-x-y-z-w}M'_yM''_zM'''_wO_2$ (LMO2), where M, M', M" and M''' are selected from the group consisting of B, Mg, Al, Si, Ca, Ti, V, Cr, Mn, Fe, Co, Ni, Cu, Zn, Y, Zr, Nb and Mo, provided that M or M' or M or M''' is selected from Mn, Co, Ni or Fe; M, M', M" and M''' being different from each other; with $0.8 \leq x \leq 1.4$; $0 \leq y \leq 0.5$; $0 \leq z \leq 0.5$; $0 \leq w \leq 0.2$ and $x+y+z+w<2$;
compound iii) of formula $Li_xMn_{2-y-z}M'_yM''_zO_4$ (LMO), where M' and M" are selected from the group consisting of B, Mg, Al, Si, Ca, Ti, V, Cr, Fe, Co, Ni, Cu, Zn, Y, Zr, Nb and Mo; M' and M" being different from each other, and $1 \leq x \leq 1.4$; $0 \leq y \leq 0.6$; $0 \leq z \leq 0.2$;
compound iv) of formula $Li_xFe_{1-y}M_yPO_4$, where M is selected from the group consisting of B, Mg, Al, Si, Ca, Ti, V, Cr, Mn, Co, Ni, Cu, Zn, Y, Zr, Nb and Mo; and $0.8 \leq x \leq 1.2$; $0 \leq y \leq 0.6$;

compound v) of formula $xLi_2MnO_3$; $(1-x)LiMO_2$ where M is selected from Ni, Co and Mn and $x \leq 1$ or a mixture of compounds i) to v).

The compound according to the invention may be used in combination with one or more electrochemically active materials which may or may not be part of compounds i) to v).

In an embodiment, the lithium-ion electrochemical cell comprises:
- at least one negative graphite-based electrode,
- at least one positive electrode comprising the compound according to the invention in admixture with one or more of the compounds i) to v).

In a preferred embodiment, the electrochemical cell comprises:
- at least one negative graphite-based electrode,
- at least one positive electrode comprising the compound according to the invention in admixture with a compound iv) as described above. The compound iv) is advantageously $LiFePO_4$. The use of a compound according to the invention in an electrochemical cell comprising a positive electrode comprising a type iv) compound allows to increase the energy density of the cell by about 8 to 9%.

In an embodiment, the electrochemical cell comprises:
- at least one negative silicon-based electrode,
- at least one positive electrode comprising the compound according to the invention in admixture with another electrochemically positive active material.

Generally, carbon is mixed with the compound according to the invention and any other electrochemically active material present in the positive electrode. The mass proportion of carbon used generally represents 3 to 10% of the sum of the masses of the positive active materials.

The process used to obtain the compound according to the invention is a mechanical alloying process. Mechanical alloying refers to all material techniques in which the energy for activating the chemical reaction between precursors is provided by mechanical means. The manufacturing process includes the steps of:
a) provision of a mixture of $Li_2O$, MnO, $MnO_2$ and optionally MO;
b) grinding the mixture in an inert atmosphere;
c) heating the mixture in an inert atmosphere at a temperature between 800 and 1000° C.;
d) cooling of the mixture to room temperature;
e) grinding the mixture in an inert atmosphere;
f) possibly adding carbon to the mixture;
g) optionally grinding the mixture in an inert atmosphere if carbon has been added in step f).

According to an embodiment, step c) of heating is carried out for a period of 3 to 5 hours.

Preferably, step c) of heating the mixture is carried out at a temperature ranging from 850 to 950° C., preferably 900° C., for a period ranging from 3.5 h to 4.5 h, preferably 4 h. The temperature rise to the desired temperature is carried out gradually over a period of 4 to 6 hours, preferably 5 hours.

Preferably, step d) of cooling to room temperature is carried out gradually over a period of 4 to 6 hours, preferably 5 hours.

According to an embodiment, step e) of grinding the mixture is carried out for a period of 13 to 17 hours.

Preferably, step e) of grinding the mixture is carried out over a period of about 15 hours.

According to an embodiment, step g) of grinding the mixture is carried out for a period of 4 to 6 hours.

The process according to the invention makes it possible to obtain a stabilization of the cubic phase as well as a nanostructuring of the compound.

EXAMPLES

Thirteen examples of compounds according to the invention have been synthesized. Their composition is shown in Table 1 below. The procedure used to synthesize them is as follows:

First, the precursors $Li_2O$, MnO, $MnO_2$ and MO, if applicable, were ground in a mortar in stoichiometric proportions in a glove box under argon atmosphere (total mass of precursors: 5 g). Then, a heat treatment in a sealed tube was carried out for 4 hours at 900° C. The temperature rise to 900° C. occurred in 5 hours, as did the temperature drop to 25° C.

The resulting material was then ground for 15 hours under argon atmosphere, in 10 mL WC tungsten carbide bowls with 4 WC balls 10 mm in diameter, using a FRITSCH™ planetary mill. The grinding speed is 700 rpm. After 5 hours, 10 hours and 15 hours, the grinding was stopped and the walls of the bowl were scraped in the glove box to homogenize the powder which is compacted on the walls. In order to avoid heating during the 5 consecutive hours of grinding, ten 30-minute cycles with a 5-minute break were carried out, alternating the direction of rotation of the grinding bowls.

Carbon was added to the material already ground for 15 hours at a rate of 5% by mass with respect to the mass of the material already ground for 15 hours. Then, the mixture containing the carbon was ground again for a further 5 hours, under the same conditions as before (10 cycles of 30 minutes at a speed of 700 rpm, alternating the direction of rotation of the grinding).

TABLE 1

Compounds according to the invention

| Example number | Formula | $xLi_2O$ | $yMnO_2$ | $zMnO$ | $tMO_a$ | M | a | Degree of oxidation of Mn | Theoretical capacity* (mAh/g) |
|---|---|---|---|---|---|---|---|---|---|
| 1 | $Li_9MnO_6$ | 0.818 | 0.091 | 0.091 | 0.000 | — | — | 3 | 1130 |
| 2 | $Li_{19}MnO_{11}$ | 0.905 | 0.048 | 0.048 | 0.000 | — | — | 3 | 1403 |
| 3 | $Li_{18}Mn_2O_{13}$ | 0.818 | 0.182 | 0.000 | 0.000 | — | — | 2 | 1089 |
| 4 | $Li_{38}Mn_2O_{23}$ | 0.905 | 0.095 | 0.000 | 0.000 | — | — | 2 | 1373 |
| 5 | $Li_{60}MnO_{32}$ | 0.968 | 0.032 | 0.000 | 0.000 | — | — | 2 | 1635 |
| 6 | $Li_6Mn_2O_5$ | 0.600 | 0.000 | 0.400 | 0.000 | — | — | 4 | 694 |
| 7 | $Li_{10}Mn_2O_7$ | 0.714 | 0.000 | 0.286 | 0.000 | — | — | 4 | 920 |
| 8 | $Li_{18}Mn_2O_{11}$ | 0.818 | 0.000 | 0.182 | 0.000 | — | — | 4 | 1174 |
| 9 | $Li_{38}Mn_2O_{21}$ | 0.905 | 0.000 | 0.095 | 0.000 | — | — | 4 | 1435 |
| 10 | $Li_{12}Mn_4O_{11}$ | 0.600 | 0.100 | 0.300 | 0.000 | — | — | 3.5 | 671 |
| 11 | $Li_9Mn_{0.5}Al_{0.5}O_6$ | 0.818 | 0.045 | 0.045 | 0.091 | Al | 1.5 | 3 | 1209 |

TABLE 1-continued

Compounds according to the invention

| Example number | Formula | $x$Li$_2$O | $y$MnO$_2$ | $z$MnO | $t$MO$_a$ | M | a | Degree of oxidation of Mn | Theoretical capacity* (mAh/g) |
|---|---|---|---|---|---|---|---|---|---|
| 12 | Li$_9$Mn$_{0.5}$V$_{0.5}$O$_6$ | 0.818 | 0.000 | 0.091 | 0.091 | V | 2.0 | 4 | 1141 |
| 13 | Li$_9$Mn$_{0.5}$Ti$_{0.5}$O$_6$ | 0.818 | 0.000 | 0.091 | 0.091 | Ti | 2.0 | 4 | 1149 |

*theoretical capacity (mAh/g) equal to the number of lithium atoms in the formula of the compound under consideration × 26800/molecular weight of the compound The position of compounds 1-10 in a ternary diagram is shown in FIG. 2. A fourteenth example of a compound that is part of the invention but not synthesized is Li$_{190}$Mn$_5$O$_{102.5}$ which has a theoretical mass capacity of 1500 mAh/g.

Figure 3:
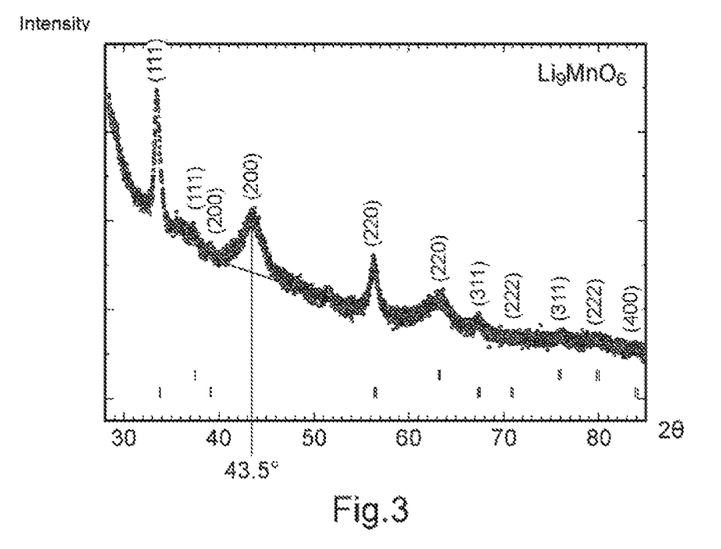
FIG. 3 is an X-ray diffraction pattern of a powder of the compound from example 1 $Li_9MnO_6$ according to the invention.

The compound of example 1 of formula Li$_9$MnO$_6$ was studied for its crystallographic structure. An X-ray diffraction pattern was performed on a powder of this compound. It is shown in FIG. 3, which shows a peak at a 2-theta angle of 43.5°. This peak has a mid-height width of about 3°, indicating that the compound is nanostructured. In addition, the Rietveld refinement of the pattern indicates that this compound crystallizes in the cubic system. It also indicates the presence of a secondary phase Li$_2$O.

Figure 4:
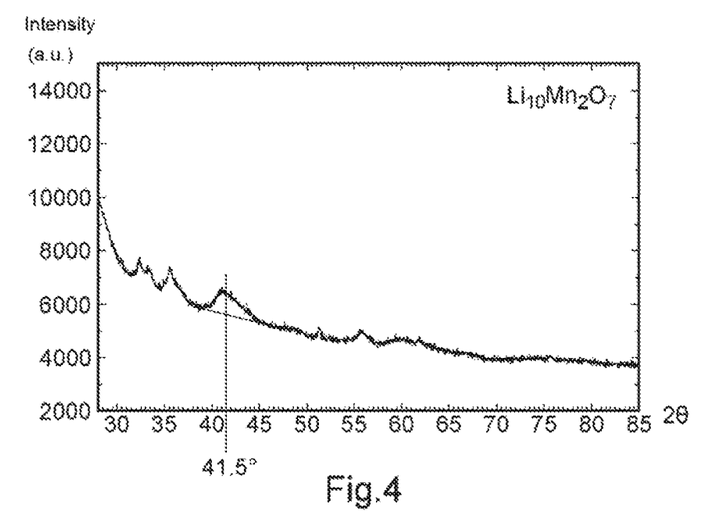
FIG. 4 is an X-ray diffraction pattern of a powder of the compound from example 7 $Li_{10}Mn_2O_7$ according to the invention.

The compound of example 7 of formula Li$_{10}$Mn$_2$O$_7$ was also studied for its crystallographic structure. An X-ray diffraction pattern was performed on a powder of this compound. It is shown in FIG. 4, which shows a peak at a 2-theta angle of 41.5°. This peak has a width at mid-height of about 3°. This indicates that the compound is nanostructured.

For comparison, the compound Li$_6$MnO$_4$ described in document WO 2015/011883, cited in the discussion of prior art, is not nanostructured. Indeed, referring to FIG. 14 of document WO2015/011883, it can be noted that the peak at a 2-theta angle between 40 and 45° has a half-height width of less than 0.3°, which means that the size of the crystallites is greater than 50 nm.

Electrical Tests:

The electrical tests were performed using Swagelok®-type laboratory electrochemical cells. The positive electrode has a surface area of 1.14 cm$^2$ and consists of from 20 to 30 mg of a mixture comprising 72% by mass of electrochemically active material and 28% by mass of carbon. The mixture was previously mixed with the FRITSCH™ planetary mill for 30 minutes at 450 rpm. The negative electrode consists of a lithium disc in large excess of capacity compared with the positive electrode. The thickness of the lithium disc is 500 µm. The two electrodes are electrically isolated by two layers of borosilicate glass fibre (Whatman™) separators. The electrolyte used is composed of 1 M LiPF$_6$ dissolved in a mixture of ethylene carbonate and methyl ethyl carbonate EC:MEC in a mass ratio of 3:7.

The charge currents were calculated to extract one Li atom per compound formula in 20 hours.

The cut-off voltage of the first charge is 4.4V and 1.2V for the discharge.

The cut-off voltage of the second charge is 4.6V and 1.2V for the discharge.

The cut-off voltage for the third charge is 4.8V and 1.2V for the discharge.

The results of the electrical tests are summarized in Table 2 below

TABLE 2

Electrical test results for compounds according to the invention

| Example number | Formula | $x$Li$_2$O | $y$MnO$_2$ | $z$MnO | $t$MO$_a$ | M | a | Theoretical capacity (mAh/g) | Total charged capacity at 4.4 V (mAh/g) |
|---|---|---|---|---|---|---|---|---|---|
| 1 | Li$_9$MnO$_6$ | 0.818 | 0.091 | 0.091 | 0.000 | — | — | 1130 | 1125 |
| 2 | Li$_{19}$MnO$_{11}$ | 0.905 | 0.048 | 0.048 | 0.000 | — | — | 1403 | 813 |
| 3 | Li$_{18}$Mn$_2$O$_{13}$ | 0.818 | 0.182 | 0.000 | 0.000 | — | — | 1089 | 641 |
| 4 | Li$_{38}$Mn$_2$O$_{23}$ | 0.905 | 0.095 | 0.000 | 0.000 | — | — | 1373 | 676 |
| 5 | Li$_{60}$MnO$_{32}$ | 0.968 | 0.032 | 0.000 | 0.000 | — | — | 1635 | 640 |
| 6 | Li$_6$Mn$_2$O$_5$ | 0.600 | 0.000 | 0.400 | 0.000 | — | — | 694 | 630 |
| 7 | Li$_{10}$Mn$_2$O$_7$ | 0.714 | 0.000 | 0.286 | 0.000 | — | — | 920 | 797 |
| 8 | Li$_{18}$Mn$_2$O$_{11}$ | 0.818 | 0.000 | 0.182 | 0.000 | — | — | 1174 | 633 |
| 9 | Li$_{38}$Mn$_2$O$_{21}$ | 0.905 | 0.000 | 0.095 | 0.000 | — | — | 1435 | 796 |
| 10 | Li$_{12}$Mn$_4$O$_{11}$ | 0.600 | 0.100 | 0.300 | 0.000 | — | — | 671 | 781 |
| 11 | Li$_9$Mn$_{0.5}$Al$_{0.5}$O$_6$ | 0.818 | 0.045 | 0.045 | 0.091 | Al | 1.5 | 1209 | 691 |
| 12 | Li$_9$Mn$_{0.5}$V$_{0.5}$O$_6$ | 0.818 | 0.000 | 0.091 | 0.091 | V | 2.0 | 1141 | 931 |
| 13 | Li$_9$Mn$_{0.5}$Ti$_{0.5}$O$_6$ | 0.818 | 0.000 | 0.091 | 0.091 | Ti | 2.0 | 1149 | 954 |

| Example number | Total charged capacity at 4.8 V (mAh/g) | Crierion 1: x-0.6 ≥ 0 x-0.6 | Criterion 2: 0.45x-0.17-y ≥ 0 0.45x-0.17-y | Criterion 3: 0.97-x ≥ 0 0.97-x | Criterion 4: y + z > 0 y + z | Criterion 5: 1-x-y ≥ 0 1-x-y | All criteria |
|---|---|---|---|---|---|---|---|
| 1 | 1124 | 0.218 | 0.107 | 0.152 | 0.182 | 0.091 | YES |
| 2 | 893 | 0.305 | 0.190 | 0.065 | 0.095 | 0.048 | YES |

TABLE 2-continued

Electrical test results for compounds according to the invention

| | | | | | | | |
|---|---|---|---|---|---|---|---|
| 3 | 641 | 0.218 | 0.016 | 0.152 | 0.182 | 0.000 | YES |
| 4 | 676 | 0.305 | 0.142 | 0.065 | 0.095 | 0.000 | YES |
| 5 | 769 | 0.368 | 0.233 | 0.002 | 0.032 | 0.000 | YES |
| 6 | 643 | 0.000 | 0.100 | 0.370 | 0.400 | 0.400 | YES |
| 7 | 829 | 0.114 | 0.151 | 0.256 | 0.286 | 0.286 | YES |
| 8 | 633 | 0.218 | 0.198 | 0.152 | 0.182 | 0.182 | YES |
| 9 | 876 | 0.305 | 0.237 | 0.065 | 0.095 | 0.095 | YES |
| 10 | 819 | 0.000 | 0.000 | 0.370 | 0.400 | 0.300 | YES |
| 11 | 925 | 0.218 | 0.153 | 0.152 | 0.091 | 0.136 | YES |
| 12 | 910 | 0.218 | 0.198 | 0.152 | 0.091 | 0.182 | YES |
| 13 | 957 | 0.218 | 0.198 | 0.152 | 0.091 | 0.182 | YES |

Table 2 shows that the compounds according to the invention have, for a charging voltage of 4.4V, a total charged capacity of at least 630 mAh/g, up to 1200 mAh/g.

Figure 5:
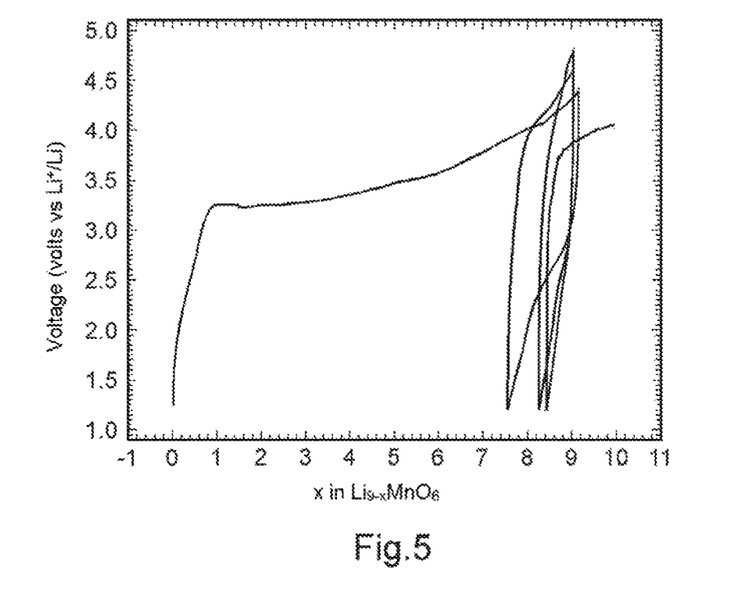
FIG. 5 shows the galvanostatic cycling curve of the compound of example 1 in a half cell of the Swagelok® type versus lithium.

The galvanostatic cycling of the compound in example 1 of formula $Li_9MnO_6$, in half-cell versus lithium (Swagelok® type) was performed. The resulting cycling curve is shown in FIG. 5, which shows that at a charge rate corresponding to the extraction of a lithium atom in 20 hours per compound formula, nearly 9 lithium atoms per compound formula are extracted from the structure (1125 mAh/g) at the first charge and 1.64 lithium atoms are reinserted during the first discharge (206 mAh/g). This result shows the strong irreversible capacity of this material since out of the 9 lithium atoms per compound formula extracted during charging, only 1.64 atoms per compound formula are able to reinsert into the compound structure during the discharge following this first charge. It can be seen that the experimental capacity under charge is very close to the theoretical capacity despite the presence of a significant amount of $Li_2O$. This result means that the nanostructured composite composed of cubic phase and $Li_2O$ makes it possible to electrochemically activate the oxidation of $Li_2O$. Finally, one can note that the charged capacity of 1125 mAh/g at 4.4V of the compound in example 1 is much higher than the charged capacity of compound $Li_6MnO_4$ described in document WO 2015/011883, cited in the discussion of the prior art, which is indeed less than 450 mAh/g.

Figure 6:
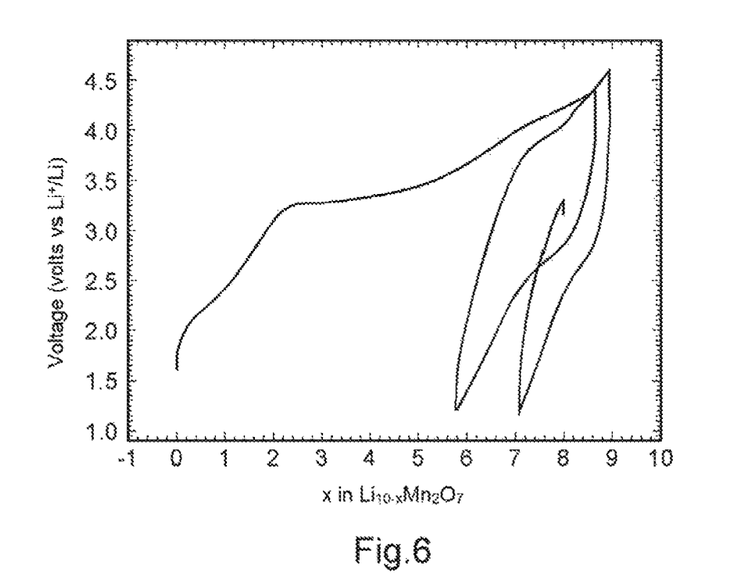
FIG. 6 shows the galvanostatic cycling curve of the compound in example 7 in a half cell of the Swagelok® type versus lithium.

The galvanostatic cycling curve of the compound in example 7 of formula $Li_{10}Mn_2O_6$, in half-cell versus lithium (Swagelok® type) is shown in FIG. 6. This figure shows that at a charging rate corresponding to the extraction of a lithium atom in 20 hours per compound formula, nearly 8.6 lithium atoms per compound formula are extracted from the structure (797 mAh/g) at the first charge and 2.8 lithium atoms per compound formula are re-inserted at the 1st discharge (260 mAh/g).

Figure 7:
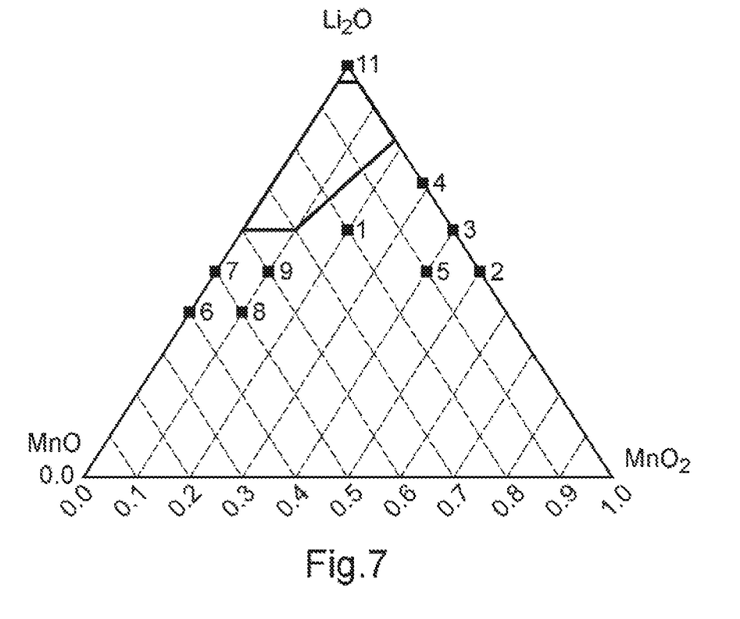
FIG. 7 is a ternary diagram ($Li_2O$, $MnO$, $MnO_2$) showing the position of the compounds in Table 3 below as counter-examples.

Compounds not part of the invention were synthesized and their capacity were measured. The position of these compounds in a ternary diagram is shown in FIG. 7. These compounds are outside the compositional domain materialized by a thick line. Table 3 shows the formulas of these compounds as well as the measured charged capacities.

TABLE 3

Electrical test results for counter-examples

| Counter example number | Formula | $xLi_2O$ | $yMnO_2$ | $zMnO$ | $tMO_a$ | M | a | Degree of oxidation of Mn | Theoretical capacity (mAh/g) | Total charged capacity at 4.4 V (mAh/g) |
|---|---|---|---|---|---|---|---|---|---|---|
| 1 | $Li_3MnO_3$ | 0.600 | 0.200 | 0.200 | 0.000 | — | — | 3 | 676 | 370 |
| 2 | $Li_2MnO_3$ | 0.500 | 0.500 | 0.000 | 0.000 | — | — | 2 | 589 | 335 |
| 3 | $Li_6Mn_2O_7$ | 0.600 | 0.400 | 0.000 | 0.000 | — | — | 2 | 758 | 620 |
| 4 | $Li_{10}Mn_2O_9$ | 0.714 | 0.286 | 0.000 | 0.000 | — | — | 2 | 985 | 489 |
| 5 | $Li_{10}Mn_5O_{14}$ | 0.500 | 0.400 | 0.100 | 0.000 | — | — | 2.4 | 557 | 277 |
| 6 | $Li_6Mn_4O_7$ | 0.429 | 0.000 | 0.571 | 0.000 | — | — | 4 | 367 | 272 |
| 7 | $Li_2MnO_2$ | 0.500 | 0.000 | 0.500 | 0.000 | — | — | 4 | 458 | 326 |
| 8 | $Li_{10}Mn_7O_{13}$ | 0.417 | 0.083 | 0.500 | 0.000 | — | — | 3.71 | 366 | 360 |
| 9 | $Li_{10}Mn_5O_{11}$ | 0.500 | 0.100 | 0.400 | 0.000 | — | — | 3.6 | 479 | 362 |
| 10 | $Li_9TiO_6$ | 0.818 | 0.000 | 0.000 | 0.182 | Ti | 2 | — | 1122 | 304 |
| 11 | $Li_2O$ | 1.000 | 0.000 | 0.000 | 0.000 | — | — | — | 1787 | 200 |

| Counter example number | Total charged capacity at 4.8 V (mAh/g) | Criterion 1: x-0.6 ≥ 0 x-0.6 | Criterion 2: 0.45x-0.17-y ≥ 0 0.45x-0.17-y | Criterion 3: 0.97-x ≥ 0 0.97-x | Criterion 4: y + z > 0 y + z | Criterion 5: 1-x-y ≥ 0 1-x-y | all criteria |
|---|---|---|---|---|---|---|---|
| 1 | 416 | 0.000 | −0.100 | 0.370 | 0.400 | 0.200 | NO |
| 2 | 331 | −0.100 | −0.445 | 0.470 | 0.500 | 0.000 | NO |
| 3 | 620 | 0.000 | −0.300 | 0.370 | 0.400 | 0.000 | NO |
| 4 | 621 | 0.114 | −0.134 | 0.256 | 0.286 | 0.000 | NO |

TABLE 3-continued

| | | Electrical test results for counter-examples | | | | | |
|---|---|---|---|---|---|---|---|
| 5 | 360 | −0.100 | −0.345 | 0.470 | 0.500 | 0.100 | NO |
| 6 | 358 | −0.171 | 0.023 | 0.541 | 0.571 | 0.571 | NO |
| 7 | 350 | −0.100 | 0.055 | 0.470 | 0.500 | 0.500 | NO |
| 8 | 420 | −0.183 | −0.066 | 0.553 | 0.583 | 0.500 | NO |
| 9 | 433 | −0.100 | −0.045 | 0.470 | 0.500 | 0.400 | NO |
| 10 | 443 | 0.218 | 0.198 | 0.152 | 0.000 | 0.182 | NO |
| 11 | 250 | 0.400 | 0.280 | −0.030 | 0.000 | 0.000 | NO |

Table 3 shows that the counter-examples have, for a charging voltage of 4.4V, a total charging capacity not exceeding 620 mAh/g. None of these compounds meet all five criteria.

Validation in Mixture with a Cathode Active Material with Low Irreversible Capacity LiFePO$_4$:

The validation of the invention was carried out by comparing two positive electrodes, one based on LiFePO$_4$ (electrode A) and the other by replacing 2% of this compound with the Li$_9$MnO$_6$ compound of 1125 mAh/g capacity (electrode B). This substitution creates an irreversible capacity of about 20 mAh/g of positive active material.

The reference electrode A was manufactured with the following mass composition: 77% LiFePO$_4$/23% carbon.

The electrode B according to the invention was manufactured with the following mass composition: 75.5% LiFePO$_4$/1.5% Li$_9$MnO$_6$/23% carbon. The mass of Li$_9$MnO$_6$ represents about 2% of the sum of the masses of positive active materials.

The mixture of active material(s) and carbon is deposited on a current collector of the positive electrode at a rate of 12.65 mg/cm$^2$.

Figure 8A:
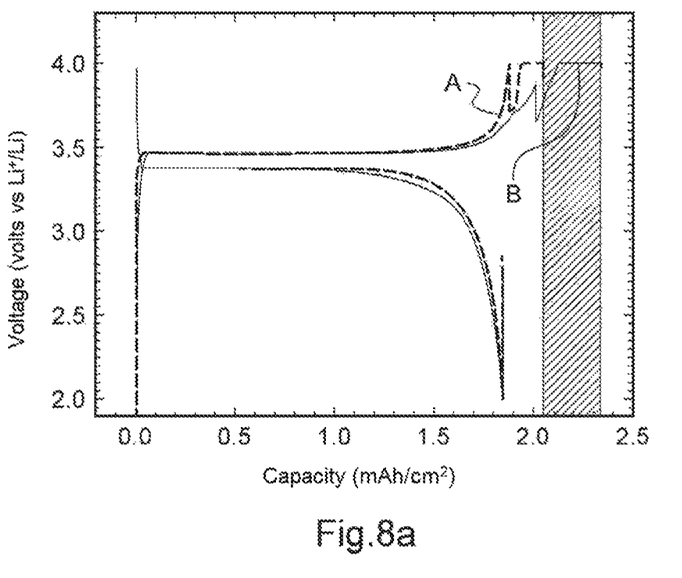
FIG. 8a shows the cycling curve of a reference electrode A and an electrode B including the compound from example 1. The abscissa axis is graduated in $mAh/cm^2$.
Figure 8B:
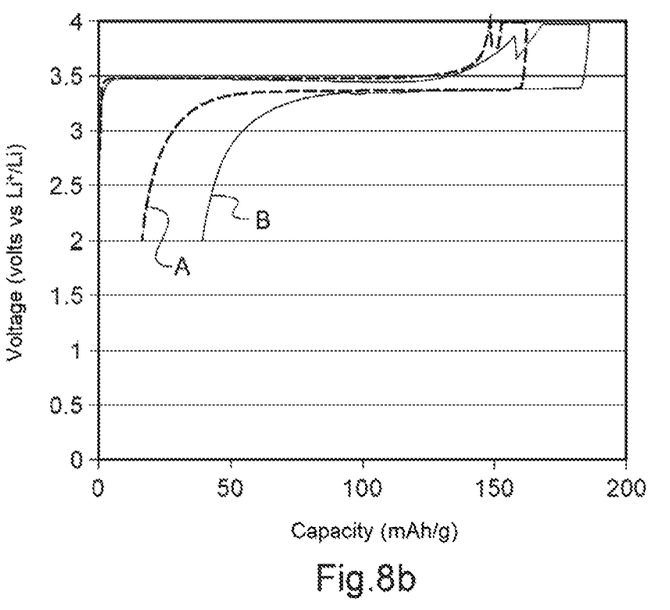
FIG. 8b shows the cycling curve of a reference electrode A and an electrode B including the compound from example 1 under the same conditions as those in FIG. 8a. The abscissa axis is graduated in mAh/g.

The electrical tests performed on both electrodes are as follows:
1: Charging at a rate allowing to extract a Li atom by compound formula in 20 hours, up to 4V.
2: Constant voltage charging supplement (4V) with an end of charge current corresponding to C/1300
3: Discharge up to 2V at a C/10 rate The charge-discharge curves for each of these electrodes have been plotted. They are shown in FIGS. 8a and 8b. FIG. 8a shows that:
  during the first charge, the charged capacity of electrode A is 1.85 mAh/cm$^2$ and the charged capacity of electrode B is 2.15 mAh/cm$^2$, i.e. an additional capacity of about 0.3 mAh/cm$^2$ for electrode B containing the compound according to the invention.
  the capacity discharged after the first charge is the same for electrode A and electrode B. It is about 1.85 mAh/cm$^2$.

FIG. 8b shows the cycling curve of electrodes A and B under the same conditions as those in FIG. 8a, with the difference that the abscissa axis is graduated in mAh/g and the starting points of the discharge curves of electrodes A and B are not overlapped.

The total charged capacity during the first charge for electrode A is 165 mAh/g and that of electrode B is 185 mAh/g. The capacity measured during the first discharge is the same for both electrodes, which means that the irreversible capacity has been increased by 20 mAh/g as expected.

The increase in the mass capacity of an electrochemical cell of the lithium-ion type by the use of a compound according to the invention in the positive electrode can be verified by calculation. The assumptions used are as follows:
A reference electrochemical cell R comprises:
  a positive reference electrode A containing an active material consisting of 100% LiFePO$_4$.
  a negative electrode containing an active material consisting 100% of a C/Si composite.
An electrochemical cell I according to the invention comprises:
  a positive electrode B containing an active material consisting of 98% LiFePO$_4$ and 2% Li$_9$MnO$_6$, which is a compound according to the invention.
  a negative electrode containing an active material consisting 100% of a C/Si composite.

LiFePO$_4$ used in the two cells R and I described above has a total mass capacity of 165 mAh/g, of which 9% is the irreversible mass capacity, or 15 mAh of irreversible capacity.

The C/Si composite used in the two cells R and I described above has a total mass capacity of 1266 mAh/g, of which 21% is the irreversible mass capacity, or 266 mAh/g of irreversible capacity.

The Li$_9$MnO$_6$ compound has a total mass capacity of 1125 mAh/g.

On the basis of the numerical values of the capacities described above and the assumption that the total capacity of the negative electrode is equal to the total capacity of the positive electrode, the mass capacity of the cells R and I expressed per gram of positive and negative material can be calculated. The results of this calculation are shown in Tables 4a and 4b below:

TABLE 4a

| | | Active material /+/ | | | Active material /−/ | | |
| | | | irreversible mass capacity (mAh/g) | total mass capacity (mAh/g) | | Irreversible mass capacity (mAh/g) | Total mass capacity (mAh/g) |
|---|---|---|---|---|---|---|---|
| | | description | | | description | | |
| Cell R | A | 100% LiFePO$_4$ | 15 | 165 | C/Si composite | 266 | 1266 |
| Cell I | B | 98% LiFePO$_4$ + 2% Li$_9$MnO$_6$ | 35 | 185 | C/Si composite | 266 | 1266 |

TABLE 4b

Cell containing 1 gram of positive active material and equal capacities of the positive and negative electrodes

| | description | /+/ material mass (g) | /−/ material mass (g) | total mass of active materials /+/ and /−/ | /−/ electrode irreversible capacity (mAh) | /+/ electrode irreversible capacity (mAh) | Cell total capacity (mAh) (=total /−/ electrode capacity) | Cell irreversible capacity (=max (irrev/−/; irrev/+/)) | Cell reversible capacity (mAh) | Cell mass capacity (mAh per g active material /+/ and /−/) | gain cell R vs. cell I (%) |
|---|---|---|---|---|---|---|---|---|---|---|---|
| Cell R | A 100% LiFePO$_4$ | 1 | 0.13 | 1.13 | 35 | 15 | 165 | 35 | 130 | 115 | |
| Cell I | B 98% LiFePO$_4$ + 2% Li$_9$MnO$_6$ | 1 | 0.15 | 1.15 | 39 | 35 | 185 | 39 | 146 | 128 | 10% |

Table 4b shows that the capacity of cell I is 128 mAh per gram of positive and negative active materials while that of cell R is only 115 mAh/g, representing a mass capacity gain of about 10%.

The capacities of the positive and negative electrodes of the reference cell R are shown schematically in FIG. 1a. The positive electrode containing 1 gram of positive material has a total capacity of 165 mAh and an irreversible capacity of 15 mAh (left rectangle). The negative electrode has an identical total capacity of 165 mAh and an irreversible capacity of 35 mAh (right rectangle).

Figure 1B:
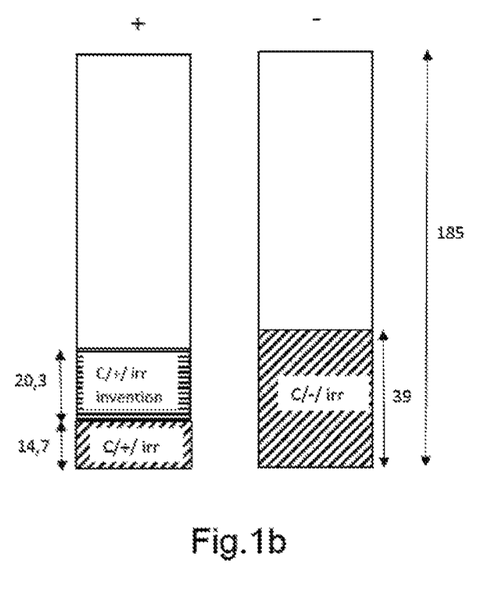

The capacities of the positive and negative electrodes of cell I according to the invention are shown schematically in FIG. 1b. In the positive electrode of cell I, 2% LiFePO$_4$ was substituted by Li$_9$MnO$_6$. The irreversible capacity provided by LiFePO$_4$ is 14.7 mAh, that provided by Li$_9$MnO$_6$ is 20.3 mAh, i.e. a total irreversible capacity of 35 mAh. The total capacity of the positive electrode is increased to 185 mAh due to the increase in capacity provided by Li$_9$MnO$_6$ (left rectangle). The irreversible capacity of the negative electrode has increased from 35 mAh to 39 mAh, due to the increase in the total capacity of the positive electrode and the assumption that the total capacity of the negative electrode is maintained at the same value as that of the positive electrode. The capacity of the negative electrode is shown in the right-hand rectangle in FIG. 1b.

The comparison of FIG. 1b with FIG. 1a shows that the addition of only 2% of Li$_9$MnO$_6$ compound has significantly reduced the difference between the irreversible capacity of the positive electrode and the irreversible capacity of the negative electrode. Table 4b above shows that this reduction in difference is accompanied by an increase in the reversible mass capacity of the cell (expressed per gram of positive and negative active materials) since the reversible mass capacity of cell I has increased by 10% compared with that of cell R. Therefore, the principle of the invention is well verified.

The invention claimed is:

1. Nanostructured compound of formula (Li$_2$O)$_x$ (MnO$_2$)$_y$ (MnO)$_z$ (MO$_a$)$_t$
   wherein
   $x+y+z+t=1$
   $1-x-y \geq 0$
   $0.97 \geq x \geq 0.6$
   $y \leq 0.45 \cdot x - 0.17$
   $y \geq 0$
   $y+z>0$
   $t \geq 0$
   $1 \leq a < 3$
   M is selected from the group consisting of Fe, Co, Ni, B, Al, Ti, Si, V, Mo, Zr and a mixture thereof,
   wherein the nanostructured compound has an X-ray diffraction pattern in which a width at mid-height of a line at a 2-theta angle between 40° and 45° is greater than 1°, a wavelength used being the Kalpha wavelength of copper.

2. Nanostructured compound according to claim 1, wherein $x \geq 0.7$.

3. Nanostructured compound according to claim 1, wherein $y=z +/-0.05$.

4. Nanostructured compound according to claim 1, wherein $y \leq 0.2$.

5. Nanostructured compound according to claim 1, wherein $z \leq 0.4$.

6. Nanostructured compound according to claim 1, wherein $t=0$.

7. Composite material comprising the nanostructured compound according to claim 1 and at least one crystalline phase Li$_2$O.

8. Composite material comprising the nanostructured compound according to claim 1 and containing from 1 to 10% by mass of carbon.

9. Electrode comprising a first electrochemically active material which is the nanostructured compound according to claim 1 and at least one second electrochemically active material.

10. Electrode according to claim 9, wherein the second electrochemically active material is selected from the group consisting of:

nanostructured compound i) of formula Li$_x$Mn$_{1-y-z}$ M'$_y$M''$_z$ PO$_4$ (LMP), where M' and M'' are different from each other and are selected from the group consisting of B, Mg, Al, Si, Ca, Ti, V, Cr, Fe, Co, Ni, Cu, Zn, Y, Zr, Nb and Mo, with $0.8 \leq x \leq 1.2$; $0 \leq y \leq 0.6$; $0 \leq z \leq 0.2$;

nanostructured compound ii) of formula Li$_x$M$_{2-x-y-z-w}$ M'$_y$M''$_z$M'''$_w$O$_2$ (LMO2), where M, M', M'' and M''' are selected from the group consisting of B, Mg, Al, Si, Ca, Ti, V, Cr, Mn, Fe, Co, Ni, Cu, Zn, Y, Zr, Nb and Mo, provided that M or M' or M'' or M''' is selected from Mn, Co, Ni or Fe;

M, M', M'' and M''' being different from each other; with $0.8 \leq x \leq 1.4$; $0 \leq y < 0.5$; $0 \leq z \leq 0.5$;

$0 \leq w \leq 0.2$ and $x+y+z+w < 2$;

nanostructured compound iii) of formula Li$_x$Mn$_{2-y-z}$ M'$_y$M''$_z$O$_4$ (LMO), where M' and M' are selected from the group consisting of B, Mg, Al, Si, Ca, Ti, V, Cr, Fe, Co, Ni, Cu, Zn, Y, Zr, Nb and Mo; M' and M" being different from each other, and $1 \leq x \leq 1.4$; $0 \leq y \leq 0.6$; $0 \leq z \leq 0.2$;

nanostructured compound iv) of formula $Li_xFe_{1-y}M_yPO_4$, where M is selected from the group consisting of B, Mg, Al, Si, Ca, Ti, V, Cr, Mn, Co, Ni, Cu, Zn, Y, Zr, Nb and Mo;

and $0.8 \leq x \leq 1.2$; $0 \leq y \leq 0.6$;

nanostructured compound v) of formula $xLi_2MnO_3$; $(1-x)LiMO_2$ where M is selected from Ni, Co and Mn and $x \leq 1$;

and a mixture of one or more of the nanostructured compounds i) to v).

11. Electrode according to claim 10 comprising the nanostructured compound ii) and M is Ni;

M' is Mn;

M" is Co and

M'" is selected from the group consisting of B, Mg, Al, Si, Ca, Ti, V, Cr, Mn, Fe, Co, Ni, Cu, Zn, Y, Zr, Nb and Mo;

with $0.8 \leq x \leq 1.4$; $0 \leq y \leq 0.5$; $0 \leq z \leq 0.5$; $0 \leq w \leq 0.2$ and $x+y+z+w<2$.

12. Electrode according to claim 10 comprising the nanostructured compound ii) and M is Ni;

M' is Co;

M" is Al; and $1 \leq x \leq 1.15$;

$y>0$;

$z>0$;

$w=0$.

13. Electrode according to claim 12 comprising the nanostructured compound ii) and $x=1$; $0.6 \leq 2-x-y-z \leq 0.85$; $0.10<y \leq 0.25$; $0.05 \leq z \leq 0.15$.

14. Electrode according to claim 10 comprising the nanostructured compound ii) of formula $LiCoO_2$.

15. Electrode according to claim 10 comprising the nanostructured compound iv) of formula $Li_xFe_{1-y}M_yPO_4$, wherein M is selected from the group consisting of B, Mg, Al, Si, Ca, Ti, V, Cr, Mn, Co, Ni, Cu, Zn, Y, Zr, Nb and Mo; and $0.8 \leq x \leq 1.2$; $0 \leq y \leq 0.6$.

16. An electrode according to claim 15 comprising the nanostructured compound iv) of formula $LiFePO_4$.

17. Electrode according to claim 10 comprising the nanostructured compound iii) with $x=1$; $0 \leq y \leq 0.1$; $z=0$ and M' is Al.

18. Electrode according to claim 10 comprising the nanostructured compound iii) of formula $LiMn_2O_4$.

19. Electrode according to claim 10, wherein the mass percentage of the nanostructured compound is less than or equal to 5% based on the total mass of all electrochemically active materials.

20. Electrochemical cell of lithium-ion type comprising an electrode according to claim 9, said electrode being a positive electrode.

21. Electrochemical cell according to claim 20, comprising:

at least one negative electrode comprising a graphite-based active material.

22. Electrochemical cell according to claim 20 comprising:

at least one negative electrode comprising an active material selected from the group consisting of tin, silicon, carbon and silicon based-compounds, carbon and tin based-compounds, carbon, tin and silicon based-compounds, and lithium titanium oxide compounds.

23. Process for manufacturing the nanostructured compound according to claim 1, comprising the steps of:

a) provision of a mixture of $Li_2O$, MnO, $MnO_2$ and optionally MO;

b) grinding the mixture in an inert atmosphere;

c) heating the mixture in an inert atmosphere at a temperature between 800 and 1000° C.;

d) cooling of the mixture to room temperature;

e) grinding the mixture in an inert atmosphere;

f) optionally adding carbon to the mixture;

g) optionally grinding the mixture in an inert atmosphere.

* * * * *